United States Patent [19]

Hodgdon et al.

[11] 4,231,855
[45] Nov. 4, 1980

[54] ELECTRODIALYSIS MEMBRANES OF HIGH INTERSTITIAL MOLALITY BASED UPON METHACRYLATE ESTER DERIVATIVES

[75] Inventors: Russell B. Hodgdon, Sudbury; Samuel S. Alexander, Boxboro, both of Mass.

[73] Assignee: Ionics, Incorporated, Watertown, Mass.

[21] Appl. No.: 16,994

[22] Filed: Mar. 2, 1979

Related U.S. Application Data

[63] Continuation-in-part of Ser. No. 935,438, Aug. 21, 1978, abandoned.

[51] Int. Cl.³ ............................................. B01D 13/02
[52] U.S. Cl. ................................. 204/301; 204/296; 521/27
[58] Field of Search ............... 204/296, 301, 180 P, 204/80; 136/146; 521/32, 33, 38, 27, 26; 526/288, 52.2, 287

[56] References Cited

U.S. PATENT DOCUMENTS

| | | | |
|---|---|---|---|
| 2,777,811 | 1/1957 | McRae et al. | 204/301 X |
| 2,800,445 | 7/1957 | Clarke | 204/301 X |
| 4,052,343 | 10/1977 | Cunningham | 521/38 |

*Primary Examiner*—Arthur C. Prescott
*Attorney, Agent, or Firm*—Norman E. Saliba

[57] ABSTRACT

This invention relates to cross-linked copolymers of methacrylate esters containing ionogenic functional groups capable of being converted into high efficiency electro-dialysis membranes. Such totally aliphatic polymer membranes have been found to give electrical resistances which can be as low as one half that of membranes previously synthesized as well as higher interstitial molality. This reduced resistance, in concert with a high degree of chemical and physical stability enables water desalination by electrodialysis to be performed over longer periods of useful membrane life and at a lower expenditure of electrical energy per thousand gallons of water desalted.

2 Claims, No Drawings

ELECTRODIALYSIS MEMBRANES OF HIGH INTERSTITIAL MOLALITY BASED UPON METHACRYLATE ESTER DERIVATIVES

CROSS REFERENCE TO RELATED APPLICATION

This application is a continuation-in-part of the applicants' prior co-pending application, Ser. No. 935,438 filed Aug. 21, 1978, now abandoned.

Membranes of both the cation and the anion selective types have certain physical and chemical requirements for their usage as solution separators in electrodialysis. These are:

1. Dimensional stability in solutions of varying ionic strengths and up and down temperature excursions.
2. Capable of operating in a pH range of from 0 to 14 over short periods of time and in a range of 2 to 12 over extended periods of time without substantial chemical or physical degradation.
3. Highly ionically conductive with a maximum resistivity of 30 ohm-cm$^2$ when measured with platinized probes at 1000 Hertz in a 0.01 normal solution of sodium chloride. This resistivity (P) is defined by the equation:

$$P = RA/t$$

where (R) = resistance in ohms measured at room temperature across a fixed area (A) in square centimeters along the ionic flux path is defined as (t).

Synthetic routes associated with the preparation of ion exchange resin beads have not been ideal for preparing dimensionally stable electrodialysis membranes because:

1. Electrodialysis membranes must be made in the form of large planar sheets of certain minimal thickness;
2. Such sheets are subject to planar stresses when exposed to osmotic pressure changes in neighboring solutions. Such stresses are constantly contributing to film fractures at stress lines;
3. Electrodialysis membranes must be free of fractures and leaks and be permselective in order to be capable of separating salt solutions of different concentrations.
4. When membranes are held firmly in an electrodialysis stack, changes in osmotic pressures from contacting salt solutions (which will induce variances of greater than 1 to 2 percent linear growth or shrinkage in size in the direction along the planar area) cannot be tolerated.

Such restrictions demand that exceptionally high crosslinking densities (35–50 mol percent) be built into the polymeric matrices of electrodialysis membranes. Such conventional crosslinked membranes as is well known in the art, are characterized as follows:

a. Extreme resistance to osmotic swelling and low water content.
b. React poorly with reagents designed to introduced ionic chemical sites within the membrane.
c. Poor electrical conductivities due to a high resin to water ratio.
d. Resistance to linear growth or contraction during changes in osmotic pressures with neighboring salt solutions and thus resistance to fracture and leakage.

It is therefore an object of this invention to develop new electrodialysis membranes which are characterized as follows:

1. A high crosslinking density with simultaneous resistance to linear growth (or shrinkage) and fracture during exposure to varying salt concentrations.
2. A highly conductive structure with high interstitial molality and conductivity in salt solutions.
3. A membrane substrate which is totally aliphatic having no benzenoid or aryl which nuclei tend to produce stress points (stiff molecules) in the finished product.

We have discovered that certain ionogenic methacrylate ester monomers copolymerize to form strong, flexible sheets having resistance to cracking, ability to be converted to both cation and anion selective membranes, have much higher conductivities (ionic) that the conventional styrene-divinyl benzene electrodialysis membranes, are not hydrolyzed in the pH range of 0–14 for short periods of time (extended periods in the range of 2–12) and show resistance to sodium hypochlorite which is better than the aryl derivatives. Such membranes have a high internal molality which leads to high current efficiency in electrodialysis.

The basic polymeric membrane sheet is prepared by the copolymerization of methacrylate ester monomers, that is, reacting a polyunsaturated crosslinking methacrylate ester monomer containing at least two vinyl groups with an ionogenic methacrylate ester monomer.

Suitable polyunsaturated crosslinking methacrylate esters are the polyol methacrylate ester monomers. These include the glycol dimethacrylates such as ethylene glycol dimethacrylate (EGDM), neopentyl glycol dimethacrylate, polyethylene glycol dimethacrylate, trimethylol propane trimethacrylate, bis-phenol A dimethacrylate, pentaerythritol and tri and tetramethacrylate.

In the systhesis of anion selective membranes, methacrylate esters containing amine groups of the tertiary type are copolymerized with crosslinking methacrylate esters. The presence of the pendant amine groups provides sites for quaternization of the polymer. Suitable esters include especially dimethylamino ethyl methacrylate (DMAEM), diethylamino ethyl methacrylate, t-butylaminoethyl methacrylate and the like.

In the synthesis of cation selective membranes the functional monomer employed includes for example 2 sulfoethyl methacrylate (2SEM), 2 acrylamido 2 methyl propane sulfonic acid and the like.

These new and novel polymeric structures contain a plurality of units of the following basic composition or formulae:

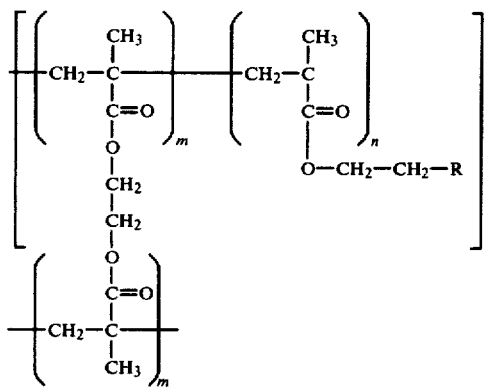

Where m is 0.35 to 0.50 mole fraction percent of n and where R is a member taken from the group consisting of:

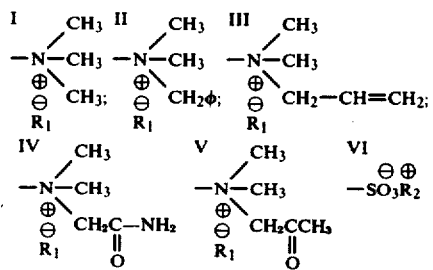

Where $R_1$ is a univalent anion of Cl, Br, I, $NO_3$, $HSO_4$ and the like and $R_2$ is a univalent cation of H, Na, K, $NH_4$ and the like. It will be noted that the polymer structure comprises a vinyl backbone with polyester crosslinks and containing pendant quaternary ammonium or sulfonic acid groups as the electrochemically active sites.

In the preparation of an anion selective membrane the polymeric sheet is first formed by the reaction, for example, of ethylene glycol dimethacrylate (EGDM) with dimethylamino ethyl methacrylate (DMAEM). The resulting polymerizate is then reacted so that the tertiary amine groups are converted to the quaternary ammonium salts to produce the novel anion selective membrane structure of the present invention.

In the preparation of a cation selective membrane the basic polymeric sheet is formed, for example, by reacting ethylene glycol dimethacrylate (EGDM) with 2 sulfoethyl methacrylate (2SEM) resulting in a sulfonic acid salt polymerizate where the reactive group consists of $SO_3^{\ominus}R_2^{\oplus}$.

The synthetic sequences by which these new electrodialysis membranes are prepared are detailed in examples which follow. It is the resulting membrane products which constitute the new materials of this invention. These new membranes can be compared to conventional prior art membranes in terms of electrical resistance per unit area in 0.01 N sodium chloride solution at 1000 Hertz, at room temperature as measured with platinum plated probes and most importantly in terms of interstitial molality which is a measure of the concentration of moveable counterions within the interstices of the polyelectrolyte resin per kilogram of water content. This comparison is shown in Table I below:

A further comparison of the properties of these new methacrylate ester membranes to the prior art polystyrene-divinyl benzene quaternary ammonium and sulfonate membranes are shown in Table II below.

From Table I and II it is readily seen how superior the ionogenic methacrylate ester based membranes are, in both conductivity and interstitial molality compared to conventional styrene-divinyl benzene derived membranes. This translates to lower cost and higher efficiency in the operation of electrodialysis stacks.

TABLE I

| MEMBRANE TYPE* | MOL PERCENT OF CROSSLINKING AGENT | WATER CONTENT % WET BASIS | RESISTIVITY ohm-cm² (0.01N NaCl) | INTERSTITIAL MOLALITY (Gram equivalents of mobile ion per kilogram of water content) |
|---|---|---|---|---|
| | | (Avg. Membrane Thickness = 0.055 cm.) | | |
| 2 | 35 | 48–50 | 10.5 | 2.60 |
| 1 | " | 44–48 | 17.0 | 2.29 |
| 2 | | 40–42 | 9.5 | 4.39 |
| 1 | " | 39–41 | 18.0 | 3.00 |
| 2 | " | 35–37 | 12.5 | 4.98 |
| 1 | " | 33–35 | 25.0 | 3.59 |
| 3 | 42 | 44–47 | 14.5 | 3.23 |
| 4 | " | 42–45 | 10.0 | 3.37 |
| 3 | 40 | 38–41 | 16.0 | 3.68 |
| 4 | " | 40–42 | 11.1 | 3.38 |

*Type
1. Anion membranes synthesized by trimethyl animation of chloromethylated styrene divinyl benzene copolymers.
2. Anion membranes synthesized by Dimethyl Sulfate Alkylation of Tertiary Amino Ethyl Methacrylate esters copolymerized with ethylene glycol dimethacrylate.
3. Cation membranes synthesized by sulfonation of styrene divinyl benzene copolymers.
4. Cation membranes synthesized by polymerization of sulfoethyl methacrylate esters with ethylene glycol dimethacrylate.

TABLE II

| MEMBRANE TYPE | *(XL-NP) | RESISTIVITY ohm-cm² (0.01N NaCl) |
|---|---|---|
| 3 | 42–45 | 14.5 |
| 4 | 45–45 | 9.8 |
| 3 | 40–40 | 16.5 |
| 4 | 40–42 | 10.6 |
| 1 | 40–49 | 18.5 |
| 2 | 35–50 | 9.8 |
| 1 | 35–40 | 16.5 |
| 2 | 35–40 | 9.2 |
| 1 | 35–30 | 28.3 |
| 2 | 35–30 | 12.2 |

*XL = mol percent of crosslinking agent
NP = volume percent of nonpolymerizable diluent Having described the invention in general terms, the following examples will more particularly illustrate the same.

PREPARATION OF ELECTRODIALYSIS MEMBRANES OF HIGH INTERSTITIAL MOLALITY AND LOW ELECTRICAL RESISTANCE BASED UPON IONOGENIC POLYMETHACRYLIC ESTER DERIVATIVES.

Example I, Part A 188 milliliters (35 mol percent) of ethylene glycol dimethacrylate (EGDM) (M.W. 198.21) are combined with ten (10) grams of azo bis isobutyronitrile (AIBN), and stirred at room temperature until dissolution occurs. To these are added 312 milliliters (65 mol percent) of dimethyl amino ethyl methacrylate (DMAEM) (MW 157.21) and 500 milliliters of the non-polymerizable solvent or diluent, diethyl benzene (50% NP)

These are mixed and poured into a tray into which are laid in alternating fashion, glass plates 20 mil thick modacrylic cloth until the top of the monomer liquid level is reached. The entire tray is put into an oven at 80° C. and heated for 17 hours. At the end of this period, the monomer and diluent mix have turned to a solid mass. The excess resin and the glass are removed to yield cloth sheets, 20 mils in thickness surrounded and impregnated with polymerized resin.

Example I, Part B

The resulting polymer sheets are placed in methyl alcohol to remove the polymerization diluent and then placed into a solution of 33.3% by volume of dimethyl sulfate in isobutyl alcohol at room temperature. These are left for 17 hours at this temperature, resulting in the tertiary amine groups of the polymer sheets being converted to quaternary ammonium groups.

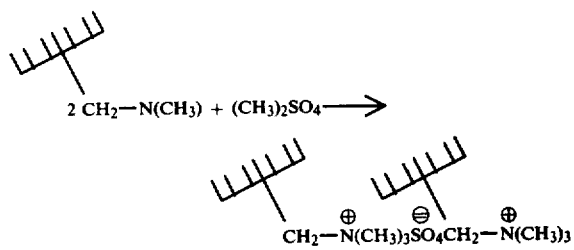

$2 \text{ CH}_2-\text{N}(\text{CH}_3) + (\text{CH}_3)_2\text{SO}_4 \longrightarrow$ $\text{CH}_2-\text{N}(\text{CH}_3)_3^{\oplus}\text{SO}_4^{\ominus}\text{CH}_2-\text{N}(\text{CH}_3)_3^{\oplus}$ In the above equation the symbol represents the membrane base polymer.

The membranes are then put into a saturated brine solution to change the polyelectrolyte portion to the chloride ($\text{Cl}^{\ominus}$) form.

The finished membranes which are smooth, leak free and transparent are found to have the following approximate properties:

| | |
|---|---|
| Mullen Burst Strength | = 145 psi |
| Thickness | = 0.059 cm |
| Resistivity | = 9.8 ohm-cm$^2$ (0.01N NaCl) (1000 Hz) |
| Interstitial Molality | = 2.33 gram equivalent per kilogram of water content. |
| Water Content | = 56.7% of wet resin (not including cloth) |

Similar results are obtained when the EGDM is replaced by a similar mol percent of one or more of the methacrylate crosslinking agents listed above.

Example II

Membrane sheets prepared as described in Example I, Part A are placed into a solution of 33.3% by volume of benzyl chloride in isobutyl alcohol and the mixture heated to 50° C. for a period of 17 hours. After cooling, the resulting anion selective membranes are rinsed in methanol and equilibrated in water The membranes have a high interstitial molality and a low electrical resistivity.

Example III

Membrane sheets prepared as described in Example I, Part A are placed into a solution of 33.3% by volume of methyl iodide (CH$_3$I) in isobutyl alcohol at room temperature. After 17 and 42 hours, respectively at this temperature the membranes are equilibrated with a sodium chloride solution.

The following approximate properties are identified:

| | 17 HOURS | 42 HOURS |
|---|---|---|
| Mullen Burst Strength | 140 psi | 140 psi |
| Thickness | 0.056 cm. | 0.056 cm. |
| Resistivity | 9.8 ohm-cm.$^2$ | 8.6 ohm-cm.$^2$ |
| Water Content of Wet Resin | 50.2% | 50.0% |
| Interstitial Molality | 2.70 | 2.72 |

Example IV

Membrane sheets are prepared as in Example I, Part A using the following. The letters XL-NP refer to mol percent crosslinking agent (XL) and volume percent of non-polymerizable diluent (NP) in the polymerizable solution

| XL-NP | 35—35 | 40—40 |
|---|---|---|
| Ethylene Glycol Dimethacrylate (EGDM) | 0.243 liters | 0.256 liters |
| Dimethyl Amino Ethyl Methacrylate (DMAEM) | 0.407 liters | 0.344 liters |
| Diethylbenzene (DEB) | 0.350 liters | 0.400 liters |
| Azo-Bis Isobutyronitrile (AIBN) | 10 gms. | 10 gms. |

The polymerizable sheets of each group are separated into two sets. One is reacted with 33.3% by volume of benzyl chloride in iso-butanol at 40° C. and the other at 25° C. for four days. Results are approximately as follows:

| | THICKNESS (CM) | | RESISTIVITY (ohm-cm.$^2$) | | INTERSTITIAL MOLARITY | | % H$_2$O | |
|---|---|---|---|---|---|---|---|---|
| (XL-NP) | 40° C. | 25° C. | 40° C. | 25° C. | 40° C. | 25° C. | 40° C. | 25° C. |
| 35—35 | 0.068 | 0.067 | 18.7 | 25.3 | 5.05 | 5.15 | 31.1 | 30.7 |

| | THICKNESS (CM) | | RESISTIVITY (ohm-cm.$^2$) | | INTERSTITIAL MOLARITY | | % H$_2$O | |
|---|---|---|---|---|---|---|---|---|
| (XL-NP) | 40° C. | 25° C. | 40° C. | 25° C. | 40° C. | 25° C. | 40° C. | 25° C. |
| 40—40 | 0.066 | 0.066 | 20.7 | 28.0 | 3.79 | 3.68 | 36.0 | 36.0 |

Example V

Membrane sheets are prepared as in Example I, Part A having XL-NP of 35–40 using the following formulation:
 EGDM—0.225 liters
 DMAEM—0.375 liters
 DEB—0.400 liters
 AIBN—10 grams The resulting sheets are separated into four groups and reacted respectively with a 33.3% by volume in isobutanol of (A) benzyl chloride (B) dimethyl sulfate (C) methyl iodide and (D) allyl bromide (CH$_2$=CH—CH$_2$Br). The reaction is at room temperature except for the benzyl chloride (50° C.). The resulting membrane properties are approximately:

| | A | B | C | D |
|---|---|---|---|---|
| RESISTIVITY (ohm-cm.$^2$) | 13 | 8 | 10 | 9 |

Example VI

Membrane sheets of the following formulation having an XL-NP of 35–30 are prepared as described in Example I, Part A:
 Ethylene Glycol Dimethacrylate—0.270 liters
 Dimethyl Amino Ethyl Methacrylate—0.430 liters
 Diethyl Benzene—0.300 liters
 Azo Bis Isobutyronitrile—10 grams The boards are converted to quaternary ammonium halides by reaction with 33.3% by volume of dimethyl sulfate in isobutanol for 17 hours at room temperature, followed by salt equilibration. Properties after conversion are approximately as follows:
 Thickness=0.055 cm.
 Mullen Burst=140 psi
 Resistivity=12.2 ohm-cm.$^2$
 Water Content=34.2%
 Interstitial Molality=4.50

Example VII

Membrane sheets prepared as in Example V are reacted for 17 hours at room temperature in a bath of methyl alcohol saturated with methyl chloride. The bath is contained in a closed vessel to prevent the methyl chloride from escaping during the reaction period. The membranes are washed with water and their properties are approximately as follows:
 Thickness=0.056 cm.
 Resistivity=9.2 ohm-cm.$^2$
 Water Content of Resin=42.9%
 Interstitial Molality=3.55

Example VIII

Membrane sheets again prepared as in Example V are reacted with a saturated solution of 2 chloroacetamide in isobutanol at 50° C. to yield a quaternary ammonium chloride membrane as follows:

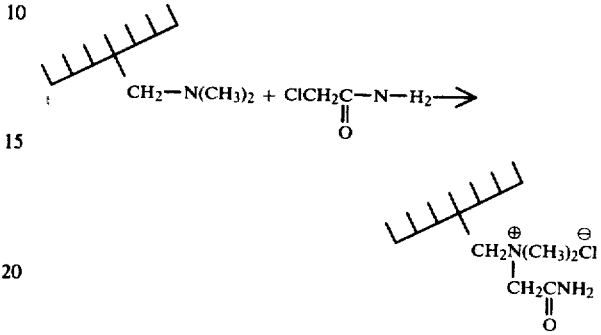

Properties are approximately as follows:
 Thickness=0.058 cm.$^2$
 Resistivity=17.1 ohm-cm.$^2$
 Water Content of Resin=42.7%
 Interstitial Molality=2.63

Example IX

This example describes the preparation of a cation selective membrane based upon a sulfonic acid methacrylate ester. The following formulation having a XL-NP of 50–30 is prepared and membrane sheets polymerized in the same manner as described in Example I, Part A.
 2-Sulfoethyl Methacrylate—(M.W. 195.21) 0.0282 liters
 Ethylene Glycol Dimethacrylate (EGDM)—0.368 liters
 Isobutyl Alcohol (a non-polymerizable solvent-)—0.268 liters
 Benzoyl Peroxide—10 grams The polymerized sheets are reacted with one molar NaCl to convert into the sodium salt form.
 Thickness=0.062 cm.
 Resistivity=9.8 ohm-cm.$^2$
 Water Content of Resin=47.7%
 Interstitial Molality=2.47

Similar results are obtained when the EGDM is replaced by a similar mol percent of one or more of the methacrylate crosslinking agents above or when the 2-SEM is replaced with a similar mol percent of 2-acrylamido-2-methyl propane sulfonic acid.

Example X

The following formulation (XL-NP=40–42) is prepared and membranes polymerized and converted as described in example IX
 2 Sulfoethyl Methacrylate (2SEM)—0.312 liters
 Ethylene Glycol Dimethacrylate (EGDM)—0.268 liters
 Isobutyl Alcohol—0.420 liters
 Benzoyl Peroxide—10 grams Upon conversion to the sodium salt the membranes are found to have high interstitial molality and low electrical resistance. Similar results are obtained when the 2 SEM is replaced by a similar molar quantity of 2 acrylamido-2 methyl propane sulfonic acid. The above examples show various embodiments of systhesis and membrane fabrication therefrom in accordance with the present invention resulting in a new and novel product having increased interstitial molality and lower electrical resistance. It is to be understood that this invention is not to be limited to the specific embodiments except as defined in the appended claims.

The embodiments of this invention in which an exclusive property or privilege is claimed are defined as follows:

1. An ion exchange resin membrane consisting of a copolymer of about 35 to about 50 mol percent of at least one compound selected from the group consisting of ethylene glycol dimethacrylate, neopentyl glycol dimethacrylate, polyethylene glycol dimethacrylate, trimethylol propane trimethacrylate, bis-phenol A dimethacrylate, pentaerythritol trimethacrylate and pentaerythritol tetramethacrylate with about 65 to about 50 mol percent respectively of a methacrylate ester salt having the chemical formula:

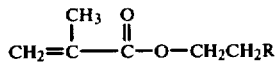

where R is an ion exchange moeity selected from the group consisting of quaternary ammonium salts and sulfonic acid salts, said copolymer having an interstitial ion exchange molality of at least about 2.2 gram equivalents of ion exchange capacity per kilogram of water content, said membrane having a resistivity as measured at 1000 Hertz in equilibrium with 0.01 N sodium chloride solution at room temperature of less than about 30 ohm cm.$^2$.

2. An electrodialysis apparatus comprising at least one ion exchange resin membrane consisting of a copolymer of about 35 to about 50 mol percent of at least one compound selected from the group consisting of ethylene glycol dimethacrylate, neopentyl glycol dimethacrylate, polyethylene glycol dimethacrylate, trimethylol propane trimethacrylate, bis-phenol A dimethacrylate, pentaerythritol trimethacrylate and pentaerythritol tetramethacrylate with about 65 to about 50 mol percent respectively of a methacrylate ester salt having the chemical formula:

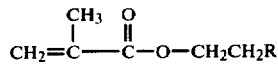

where R is an ion exchange moeity selected from the group consisting of quaternary ammonium salts and sulfonic acid salts, said copolymer having an interstitial ion exchange molality of at least about 2.2 gram equivalents of ion exchange capacity per kilogram of water content, said membrane having a resistivity as measured at 1000 Hertz in equilibrium with 0.01 N aqueous sodium chloride solution at room temperature of less than about 30 ohm-cm.$^2$.

* * * * *